No. 677,661. Patented July 2, 1901.
J. S. HIGHFIELD.
APPARATUS FOR REGULATING PRESSURE IN ELECTRIC MAINS CONNECTED TO STORAGE BATTERIES.
(Application filed Mar. 12, 1901.)
(No Model.)
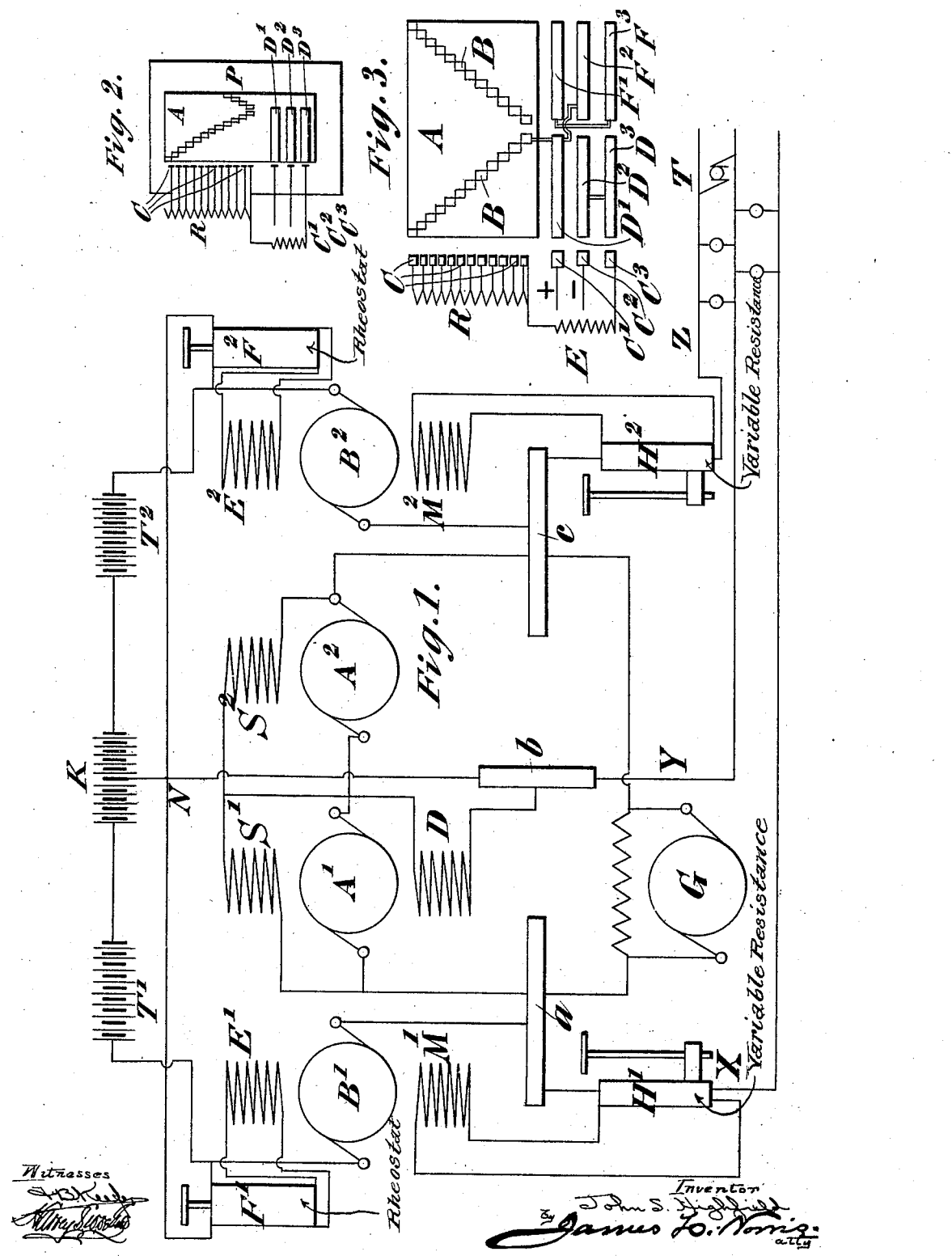

UNITED STATES PATENT OFFICE.

JOHN SOMERVILLE HIGHFIELD, OF ST. HELENS, ENGLAND.

APPARATUS FOR REGULATING PRESSURE IN ELECTRIC MAINS CONNECTED TO STORAGE BATTERIES.

SPECIFICATION forming part of Letters Patent No. 677,661, dated July 2, 1901.

Application filed March 12, 1901. Serial No. 50,850. (No model.)

*To all whom it may concern:*

Be it known that I, JOHN SOMERVILLE HIGHFIELD, a citizen of England, residing at Windle House, St. Helens, in the county of Lancaster, England, have invented certain new and useful Improvements in Apparatus for Regulating Pressure in Electric Mains Connected to Storage Batteries, (for which I have applied for a patent in Great Britain, dated February 12, 1901, No. 3,047,) of which the following is a specification.

My invention relates to apparatus for regulating pressure in electric mains connected to accumulator-batteries. In such installations it is usual to employ in the central station several dynamos of different sizes so worked as to suit variations of the load. It is, however, impossible in practice to arrange the plant so that this object can be fully attained. In most stations for supply of direct current it is customary to install a battery of secondary cells having its varying pressure usually corrected by means of regulating-switches, by which a greater or less number of the battery-cells can be cut off from the supply-bars; also, a small generator or booster is generally used to raise the pressure in the omnibus-bars, so as to charge the battery. By the use of a battery in this way the pressure on the mains can be regulated, and by charging the cells when the external load is insufficient to occupy the running plant and by discharging the cells to help one generator when there is insufficient load for two the running plant may be always charged to its full load. The arrangement of regulating cells and switches is, however, cumbersome and requires much attention, besides involving necessary regulation of the booster-pressure.

According to my invention I employ a booster which is connected in series with the storage battery, so that the whole of the battery-current passes through the booster-armature. I arrange this booster so that its pressure can be varied from a maximum in one direction through zero to a maximum in the other direction. When it is excited in the one direction, it raises the pressure in the omnibus-bars to charge the battery, and when it is excited in the other direction when the battery-pressure is less than that required it raises the battery-pressure to the desired amount. I wind the field-magnets of the booster with two windings, one of which carries any desired part of the outgoing current. The other coil is excited from the battery-terminals, and by means of a reversing and regulating switch I can cause the current to flow in either direction in this coil and vary its strength from zero to a maximum. I design the booster so that the pressure given by its armature varies as nearly as possible as the strength of the magnetizing force due to the two exciting-coils. This end is attained by working the field-magnets at a low induction and by working with a large air-gap between the pole-face and the armature, so as to reduce armature reaction. I further make the commutator large, so as to work the brushes, preferably of carbon, at a low-current density, so that when the field is weak and the armature-current is large there may not be serious sparking at the brushes.

I shall describe my invention as applied to a three-wire system of distribution, referring to the accompanying drawings.

Figure 1 is a diagrammatic view of the connections. In the case of a three-wire system I prefer to drive two boosters—one for each half of the battery—from a balancing-machine, though they may be driven by a separate motor. In this figure, $a\,b\,c$ are the three omnibus-bars from and to which current is to be supplied. K is the storage battery, and G is one of the generators. I prefer to use a battery of such size that it can give the same output as the smallest generator for at least three hours. The generator is assumed to be shunt-wound, as is usual in a lighting-station. $x\,y\,z$ are three of the outgoing feeders. $A'$ and $A^2$ are the armatures of the balancing-machine referred to. $B'$ and $B^2$ are the armatures of the boosters. These armatures are preferably coupled in line on one shaft. $S'\,S^2$ are the shunt field-coils of the balancing-machines. D is an extra coil on one of the fields, which carries the out-of-balance current and serves to keep constant the volts given by the armatures $A'\,A^2$ in a well-known way. The current flows out of or into the battery through the booster-armatures $B'$ and $B^2$ to the omnibus-bars $a\,c$, as shown, and the middle point N of the battery may be connected to the middle bar $b$.

The fields of the boosters are excited by fine-wire coils E' E² and by thick-wire coils M' M².

One or more of the two outgoing feeders, as $x\,z$, are connected to the omnibus-bars by resistances H' H², the value of which may be gradually varied in any suitable manner. The coils M' M² are connected, as shown, in shunt with the resistances, so that the greater the resistances H' H² are made the greater will be the current through the coils M' M². The fine-wire coils E' E² are connected through reversing regulating-switches F' F² to the terminals T' T² and the middle point N of the battery K. The coils M' M² are so proportioned that when they are carrying the full current for which they are made the booster-armatures B' B² give pressures in such a direction as to add to the battery-pressure equal to the greatest pressure by which the battery falls below that required by the omnibus-bars $a\,b\,c$.

The coils E' E² are proportioned so that when no current is flowing in the coils M' M² and the maximum current is flowing in E' E² when the battery is fully charged the armatures B' B² add to the pressure of the omnibus-bars sufficiently to raise it to the highest pressure required to charge the battery.

Though any type of reversing and regulating switch may be used for F' F², I prefer to use a switch as shown diagrammatically in Fig. 2. The switch consists of a metal cylinder A, (shown with the other parts in a developed form in Fig. 3,) on which are fixed contact-pieces B, as in an ordinary tramway-controller. As the cylinder is rotated these contacts engage with fixed flexible contacts C C, insulated from the frame P and from one another, connected to a resistance R, so proportioned as to steadily vary as it is cut in the field of the booster from a maximum to zero when the cylinder A is placed so as to disengage all the contacts B from the contacts C. Mounted on the cylinder are longer contacts D' D² D³ F' F² F³, all of which are insulated from the cylinder except D' and F², which are electrically connected to it. D² is connected to D³, and F' to F³. The fixed contacts C' C² are connected to one of the terminals T' T² and the middle point N of the battery K, and the coils E' E² of the boosters are connected each to its own switch to the last contact C and to C³, as shown on the drawings. As the cylinder is turned from its position in Fig. 3 to the left C' connects, through D', the cylinder A and the first contact B to the first point of the resistance through the resistance to E', thence through C³, D³, D², and C² to the other pole of the supply, and as the cylinder is turned it cuts out the resistance. On reversing the direction the resistance is put in, the circuit is opened, and continuing the movement of the cylinder in the right-hand direction F' connects to C', to which is connected the positive pole of the supply, F' connects through F³ to C³, thence through E' to the last contact C, through the resistance to the first contact C, through the first contact B to the cylinder A, to F², which connects to C² the other pole of the supply. Continuing the motion, the resistance R is cut out in steps, as before. With this switch, therefore, the current in E' can be started from zero, brought step by step to a maximum, decreased to zero, and brought again to a maximum in two opposite directions. Moreover, the circuit can only be opened when the whole of the resistance R has been inserted.

I may connect the two resistance-switches F' F² mechanically, so that when desired the two can be operated together by one handle. I may similarly connect H' and H².

The apparatus is operated as follows: When the battery K is giving the correct pressure on the omnibus-bars $a\,b\,c$ and working the load without the generator G, F' F² are so placed that no current flows in the coils E' E². The resistances H' H² are so placed that very little current passes through M' M². As the external load T increases I increase the value of H' H², and so shunt current around M' M² and cause B' B² to raise the battery-pressure as it falls off, due to increasing load. Once H' and H² are set correctly, which can be determined by experiment for any particular installation, the action is automatic as the current increases and the pressure given by B' B² rises, owing to the greater current. Should the pressure of the battery K need further correction, F' F² may be moved so as to send a current into E' E² in such a direction as to help M' M². When the battery is fully discharged, a generator G is connected to supply current to the omnibus-bars. It is gradually speeded up to full load, part of the current going out through $a$ and $b$ to the load T. As the pressure tends to rise the switches F' F² are moved so as to cause a current to flow through E' E² to oppose the coils M' M². This causes the pressure given by B' B² to oppose the battery-pressure, and so cause current to flow into it. As the pressure of the battery rises more current flows through the coils E' E₂ and the action is partly automatic, the rise of battery-pressure being compensated by the greater strength of the current in E' E², causing the boosters B' B² to give more pressure to help the charge. When a sudden extra load comes on at T, the extra current in M' M² weakens the action of E' E², and so decreases the charging-current and enables the generator G to send more current to the external circuit. As the load exceeds the output of the generator G the battery by altering the switches F' F² can be allowed to help the generator, and as the load still increases another generator may be connected to the omnibus-bars $a\,b$, when the battery can be again charged. In the way described the generators can always be kept at full load by a very small adjustment of the two handles controlling F' F² and H' H², and the whole regulation of the station-pressure is done by these means. The tendency to variation of the pressure due to sudden alterations of load is corrected by the action of the coils M' M², as described.

In some cases I may omit the coils M' M² and their controlling-gear, then effecting the regulation on E' E². The action is automatic only when charging, the rise of pressure of the battery then strengthening the action of the coils E' E².

Should it be necessary to charge one side of the battery more than the other at any time, the switches F' and F² are mechanically disconnected and operated separately, so as to give more boost on the side desired.

The balancing-machine, of which A' A² are the armatures, acts in the ordinary manner to steady the pressure on the two sides of the system. The boosters may be connected to any type of balancer or to a separate motor. For a two-wire system only one-half of the combination would be used.

Having thus described the nature of this invention and the best means I know of carrying the same into practical effect, I claim—

1. The combination of a generator, a storage battery and a booster, the armature of said booster being connected with said generator and with said battery, and the field-magnets thereof being composed of two windings one of which is connected with the line on opposite sides of a variable resistance and the other of which is provided with means whereby the flow of current therethrough may be controlled, as and for the purpose set forth.

2. The combination of a generator, a storage battery and a booster, the armature of said booster being connected with said generator and with said battery, and the field-magnets thereof being composed of two windings one of which is connected with the line on opposite sides of a variable resistance, and a reversing and regulating switch for controlling the flow of current through the other of said coils, as and for the purpose set forth.

3. The combination of a generator, a storage battery, a booster having its armature connected with said generator and with said battery and having its field-magnets composed of two windings, one of which is connected with the line on opposite sides of a variable resistance, a switch for controlling the flow of current through the other of said windings, and a balancing-motor for the booster connected with said generator and having shunt field-coils, and a supplemental coil D connected with one of said field-coils, as and for the purpose set forth.

In testimony whereof I have hereunto set my hand in presence of two subscribing witnesses.

JOHN SOMERVILLE HIGHFIELD.

Witnesses:
  HY. LINDON RILEY,
  JOHN WORSLEY.